(12) United States Patent
Vandenberg, III et al.

(10) Patent No.: US 11,543,535 B2
(45) Date of Patent: Jan. 3, 2023

(54) LIDAR FAULT DETECTION SYSTEM

(71) Applicant: UATC, LLC, San Francisco, CA (US)

(72) Inventors: Dirk John Vandenberg, III, Pittsburgh, PA (US); James Allen Haslim, Dublin, CA (US); Thomas Lawrence Smith, Rodeo, CA (US); Adam David Kenvarg, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 409 days.

(21) Appl. No.: 16/750,186

(22) Filed: Jan. 23, 2020

(65) Prior Publication Data
US 2021/0003711 A1  Jan. 7, 2021

Related U.S. Application Data

(60) Provisional application No. 62/870,183, filed on Jul. 3, 2019.

(51) Int. Cl.
*G01S 17/93* (2020.01)
*G01S 17/931* (2020.01)
*G05D 1/02* (2020.01)
*G01S 7/48* (2006.01)

(52) U.S. Cl.
CPC .......... *G01S 17/931* (2020.01); *G01S 7/4808* (2013.01); *G05D 1/024* (2013.01)

(58) Field of Classification Search
None
See application file for complete search history.

(56) References Cited

U.S. PATENT DOCUMENTS 6,127,964 A   10/2000   Kageyama

FOREIGN PATENT DOCUMENTS

| DE | 102012102651 | 7/2013 |
| EP | 3001137 | 3/2016 |
| JP | 2015081877 | 4/2015 |
| WO | WO 2015/090529 | 6/2015 |

OTHER PUBLICATIONS

International Search Report and Written Opinion for Application No. PCT/US2020/040647, dated Oct. 20, 2020, 36 pages.

*Primary Examiner* — Hovhannes Baghdasaryan
(74) *Attorney, Agent, or Firm* — Dority & Manning, P.A.

(57) ABSTRACT

Aspects of the present disclosure involve systems, methods, and devices for fault detection in a Lidar system. A fault detection system obtains incoming Lidar data output by a Lidar system during operation of an AV system. The incoming Lidar data includes one or more data points corresponding to a fault detection target on an exterior of a vehicle of the AV system. The fault detection system accesses historical Lidar data that is based on data previously output by the Lidar system. The historical Lidar data corresponds to the fault detection target. The fault detection system performs a comparison of the incoming Lidar data with the historical Lidar data to identify any differences between the two sets of data. The fault detection system detects a fault condition occurring at the Lidar system based on the comparison.

20 Claims, 7 Drawing Sheets

LIDAR FAULT DETECTION SYSTEM

CLAIM FOR PRIORITY

This application claims the benefit of priority of U.S. Provisional Application No. 62/870,183, filed Jul. 3, 2019, which is hereby incorporated by reference in its entirety.

TECHNICAL FIELD

The subject matter disclosed herein relates to light detection and ranging (Lidar) systems. In particular, example embodiments relate to systems and methods for fault detection in Lidar systems.

BACKGROUND

Lidar is a radar-like system that uses lasers to create three-dimensional representations of surrounding environments. A Lidar unit includes at least one laser emitter paired with a detector to form a channel, though an array of channels may be used to expand the field of view of the Lidar unit. During operation, each channel emits a laser signal into the environment that is reflected off of the surrounding environment back to the detector. A single channel provides a single point of ranging information. Collectively, channels are combined to create a point cloud that corresponds to a three-dimensional representation of the surrounding environment. The Lidar unit also includes circuitry to measure the time of flight—i.e., the elapsed time from emitting the laser signal to detecting the return signal. The time of flight is used to determine the distance of the Lidar unit to the detected object.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
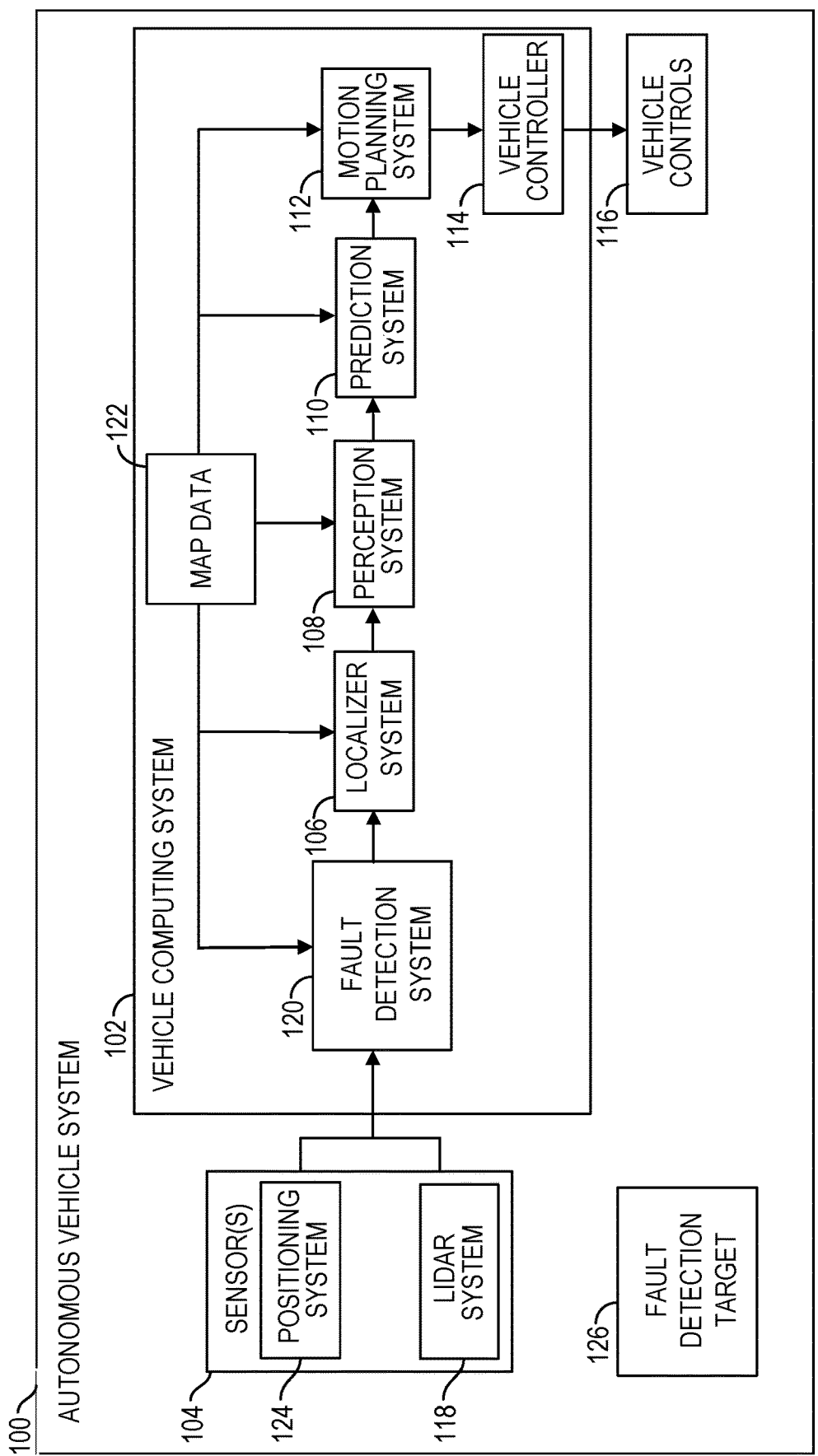
FIG. 1 is a block diagram illustrating an example autonomous vehicle (AV) system in which a fault detection system may be deployed, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Increasingly, Lidar is finding applications in autonomous vehicles (AVs) such as partially or fully autonomous cars. For example, data provided by Lidar systems is frequently used in the localization, perception, prediction, and motion planning of AVs because this data provides important information that describes the surrounding environment. During an operating AV's lifetime, optical components of its Lidar system may become dislodged, damaged, dirty, or otherwise occluded, and the intensity of laser signals provided by laser emitters of the Lidar system may be reduced, or detectors of the Lidar system may become less sensitive. All of these fault conditions reduce the ability of the Lidar system to sense the external world and provide accurate data to the components of the AV system, which severely impacts the AV system's ability to perform localization, perception, prediction, and motion planning operations. In general, any circumstance that impacts the Lidar system's ability to sense the surrounding environment can be problematic for proper operation of the AV system. However, given that the surrounding environment is constantly changing during the operation of the AV system, it can be difficult to determine when the Lidar system's ability to sense the surrounding environment is impaired because there may be no indication of the underlying fault conditions that lead to the impairment.

Aspects of the present disclosure address these foregoing issues, among others, with systems, methods, and devices for fault detection in Lidar systems. A method for fault detection includes comparing incoming Lidar data with historical Lidar data to determine whether the Lidar system is currently operating as well as it was at a previous time. To overcome challenges presented by ever-changing surrounding environments, a fault detection target on an exterior of the AV is relied upon in fault detection to provide a standard of comparison when comparing current incoming Lidar data with historical Lidar data. The fault detection target may comprise one or more fixed features of the exterior of the AV or may comprise one or more separate components that are affixed thereto.

Consistent with some embodiments, a fault detection system obtains incoming Lidar data output by a Lidar system during operation of an AV system. The incoming Lidar data includes one or more data points corresponding to the fault detection target. That is, the one or more data points are based on one or more return signals resulting from emitted light signals reflecting off the fault detection target. The fault detection system accesses historical Lidar data that is based on data previously output by the Lidar system. The historical Lidar data corresponds to the fault detection target. The historical Lidar data may include raw data or average values based on multiple previous passes over the fault detection target. In some embodiments, the historical Lidar data may include one or more algorithms based on raw Lidar data (e.g., artificial intelligence (AI) algorithms trained on raw Lidar data).

The fault detection system performs a comparison of the incoming Lidar data with the historical Lidar data to identify any differences between the two sets of data. The fault detection system may detect a fault condition occurring at the Lidar system based on the comparison. For example, the fault detection system may determine that a difference between the incoming Lidar data and the historical Lidar data satisfies a threshold condition. Based on detecting the fault condition, the fault detection system initiates a fail-safe state for the AV system. The initiating of the fail-safe state may result in one or more operations of the AV system being restricted until a remediation action (e.g., replacing, repairing, or cleaning a component of the AV system) is performed to avoid any potential issues that may occur as a result of the Lidar system providing potentially inaccurate information to downstream components of the AV system.

With reference to FIG. 1, an example autonomous vehicle (AV) system 100 is illustrated, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the AV system 100 to facilitate additional functionality that is not specifically described herein.

The AV system 100 is responsible for controlling a vehicle. The AV system 100 is capable of sensing its environment and navigating without human input. The AV system 100 can include a ground-based AV (e.g., car, truck, bus), an air-based AV (e.g., airplane, drone, helicopter, or other aircraft), or other types of vehicles (e.g., watercraft).

The AV system 100 includes a vehicle computing system 102, one or more sensors 104, and one or more vehicle controls 116. The vehicle computing system 102 can assist in controlling the AV system 100. In particular, the vehicle computing system 102 can receive sensor data from the one or more sensors 104, attempt to comprehend the surrounding environment by performing various processing techniques on data collected by the sensors 104, and generate an appropriate motion path through such a surrounding environment. The vehicle computing system 102 can control the one or more vehicle controls 116 to operate the AV system 100 according to the motion path.

As illustrated in FIG. 1, the vehicle computing system 102 can include one or more computing devices that assist in controlling the AV system 100. The vehicle computing system 102 can include a localizer system 106, a perception system 108, a prediction system 110, a motion planning system 112, and a fault detection system 120 that cooperate to perceive the dynamic surrounding environment of the AV system 100 and determine a trajectory describing a proposed motion path for the AV system 100. The vehicle computing system 102 can additionally include a vehicle controller 114 configured to control the one or more vehicle controls 116 (e.g., actuators that control gas flow (propulsion), steering, braking) to execute the motion of the AV system 100 to follow the trajectory.

In particular, in some implementations, any one of the localizer system 106, the perception system 108, the prediction system 110, the motion planning system 112, or the fault detection system 120 can receive sensor data from the one or more sensors 104 that are coupled to or otherwise included within the AV system 100. As examples, the one or more sensors 104 can include a Lidar system 118, a Radio Detection and Ranging (RADAR) system, one or more cameras (e.g., visible spectrum cameras, infrared cameras), and/or other sensors. The sensor data can include information that describes the location of objects within the surrounding environment of the AV system 100.

As one example, for the Lidar system 118, the sensor data can include point data (also referred to herein as "Lidar data") that includes the location (e.g., in three-dimensional space relative to the Lidar system 118) of a number of points that correspond to objects that have reflected an emitted laser. For example, the Lidar system 118 can measure distances by measuring the time of flight (ToF) that it takes a short laser pulse to travel from the sensor(s) 104 to an object and back, calculating the distance from the known speed of light. The point data further includes an intensity value for each point, which, as described above, can provide information about the reflectiveness of the objects that have reflected the emitted laser.

As another example, for RADAR systems, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for cameras, various processing techniques (e.g., range imaging techniques such as, for example, structure from motion, structured light, stereo triangulation, and/or other techniques) can be performed to identify the location (e.g., in three-dimensional space relative to a camera) of a number of points that correspond to objects that are depicted in imagery captured by the camera. Other sensor systems can identify the location of points that correspond to objects as well.

As another example, the one or more sensors 104 can include a positioning system 124. The positioning system 124 can determine a current position of the AV system 100. The positioning system 124 can be any device or circuitry for analyzing the position of the AV system 100. For example, the positioning system 124 can determine position by using inertial sensors; by using a satellite positioning system; based on Internet Protocol (IP) address; by using triangulation and/or proximity to network access points or other network components (e.g., cellular towers, Wi-Fi access points); and/or by other suitable techniques. The position of the AV system 100 can be used by various systems of the vehicle computing system 102.

Thus, the one or more sensors 104 can be used to collect sensor data that includes information that describes the location (e.g., in three-dimensional space relative to the AV system 100) of points that correspond to objects within the surrounding environment of the AV system 100.

In addition to the sensor data, the localizer system 106, the perception system 108, the prediction system 110, the motion planning system 112, and/or the fault detection system 120 can retrieve or otherwise obtain map data 122 that provides detailed information about the surrounding environment of the AV system 100. The map data 122 can provide information regarding the identity and location of different travelways (e.g., roadways, alleyways, trails, and other paths designated for travel), road segments, buildings, or other items or objects (e.g., lampposts, crosswalks, curbing); known reflectiveness (e.g., radiance) of different travelways (e.g., roadways), road segments, buildings, or other items or objects (e.g., lampposts, crosswalks, curbing); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The localizer system 106 receives the map data 122 and some or all of the sensor data from the sensors 104, and generates vehicle poses for the AV system 100 based on this information. A vehicle pose describes the position and orientation of the vehicle. The position of the AV system 100 is a point in a three-dimensional space. In some examples, the position is described by values for a set of Cartesian coordinates, although any other suitable coordinate system may be used. In some examples, the vehicle orientation is described by a yaw about the vertical axis, a pitch about a first horizontal axis, and a roll about a second horizontal axis. In some examples, the localizer system 106 generates vehicle poses periodically (e.g., every second, every half second). The localizer system 106 appends time stamps to vehicle poses, where the time stamp for a pose indicates the point in time that is described by the pose. The localizer system 106 generates vehicle poses by comparing sensor data (e.g., remote sensor data) to the map data 122 describing the surrounding environment of the AV system 100.

In some examples, the localizer system 106 includes one or more localizers and a pose filter. Localizers generate pose estimates by comparing remote sensor data (e.g., Lidar data, RADAR data) to the map data 122. The pose filter receives pose estimates from the one or more localizers as well as other sensor data such as, for example, motion sensor data from an inertial measurement unit (IMU), encoder, odometer, and the like. In some examples, the pose filter executes a Kalman filter or other machine learning algorithm to combine pose estimates from the one or more localizers with motion sensor data to generate vehicle poses.

The perception system 108 can identify one or more objects that are proximate to the AV system 100 based on sensor data received from the one or more sensors 104, inferred reflectance values provided by the fault detection system 120, and/or the map data 122. In particular, in some implementations, the perception system 108 can determine, for each object, state data that describes a current state of the object. As examples, the state data for each object can describe an estimate of the object's current location (also referred to as position), current speed (also referred to as velocity), current acceleration, current heading, current orientation, size/footprint (e.g., as represented by a bounding shape such as a bounding polygon or polyhedron), class (e.g., vehicle, pedestrian, bicycle, or other), yaw rate, reflectance characteristics, specular or diffuse reflectivity characteristics, and/or other state information.

In some implementations, the perception system 108 can determine state data for each object over a number of iterations. In particular, the perception system 108 can update the state data for each object at each iteration. Thus, the perception system 108 can detect and track objects (e.g., vehicles) that are proximate to the AV system 100 over time. In some instances, the perception system 108 updates state data for an object based on a diffuse reflectivity value of the object computed by the fault detection system 120.

The prediction system 110 can receive the state data from the perception system 108 and predict one or more future locations for each object based on such state data. For example, the prediction system 110 can predict where each object will be located within the next 5 seconds, 10 seconds, 20 seconds, and so forth. As one example, an object can be predicted to adhere to its current trajectory according to its current speed. As another example, other, more sophisticated prediction techniques or modeling can be used.

The motion planning system 112 can determine a motion plan for the AV system 100 based at least in part on the predicted one or more future locations for the objects provided by the prediction system 110 and/or the state data for the objects provided by the perception system 108. Stated differently, given information about the current locations of objects and/or predicted future locations of proximate objects, the motion planning system 112 can determine a motion plan for the AV system 100 that best navigates the AV system 100 relative to the objects at such locations.

The motion plan can be provided by the motion planning system 112 to the vehicle controller 114. In some implementations, the vehicle controller 114 can be a linear controller that may not have the same level of information about the environment and obstacles around the desired path of movement as is available in other computing system components (e.g., the perception system 108, prediction system 110, motion planning system 112). Nonetheless, the vehicle controller 114 can function to keep the AV system 100 reasonably close to the motion plan.

More particularly, the vehicle controller 114 can be configured to control motion of the AV system 100 to follow the motion plan. The vehicle controller 114 can control one or more of propulsion and braking of the AV system 100 to follow the motion plan. The vehicle controller 114 can also control steering of the AV system 100 to follow the motion plan. In some implementations, the vehicle controller 114 can be configured to generate one or more vehicle actuator commands and to further control one or more vehicle actuators provided within the vehicle controls 116 in accordance with the vehicle actuator command(s). Vehicle actuators within the vehicle controls 116 can include, for example, a steering actuator, a braking actuator, and/or a propulsion actuator.

The fault detection system 120 is responsible for detecting fault conditions occurring at the Lidar system 118. The fault conditions may, for example, comprise or correspond to one or more of a damaged, dirty, dislodged, fouled, or otherwise occluded optical component (e.g., a lens of the Lidar system 118), a reduced or diminished intensity of laser signals emitted by one or more emitting lasers of the Lidar system 118, or a reduced sensitivity of one of the detectors in the Lidar system 118.

During operation of the AV system 100, the fault detection system 120 compares incoming Lidar data output by the Lidar system 118 with historical Lidar data generated based on data previously output by the Lidar system 118. In particular, the fault detection system 120 compares incoming Lidar data corresponding to a fault detection target 126 with historical Lidar data corresponding to the fault detection target 126. In some embodiments, the historical Lidar data may be stored in and accessed from a memory of the vehicle computing system 102. In some embodiments, the historical Lidar data may be stored and accessed from a memory in the Lidar system 118 or a memory in the fault detection system 120. In some embodiments, the fault detection system 120 along with the stored historical data may be implemented within the Lidar system 118.

The fault detection system 120 may detect one or more fault conditions based on the comparison of the incoming Lidar data with the historical Lidar data. For example, the fault detection system 120 may identify a difference between the incoming and historical Lidar data that indicates that a fault condition is occurring. In response to detecting the fault condition, the fault detection system 120 initiates a fail-safe state for the AV system 100. For example, the fault detection system 120 may issue one or more commands to the vehicle controller 114 to initiate the fail-safe state. The initiating of the fail-safe state may cause one or more operations of the AV system 100 to be restricted.

By relying specifically on Lidar data corresponding to the fault detection target 126, the fault detection system 120 ensures a standard of comparison for comparing the incoming Lidar data with the historical Lidar data, given that the fault detection target 126 is fixed rather than constantly changing like the surrounding environment. The fault detection target 126 may comprise one or more fixed features of an exterior of the AV, a separate component that is affixed thereto, or a combination thereof. For example, the fault detection target 126 may comprise a surface coating (e.g., a paint strip) applied to the exterior of the vehicle. As another example, the fault detection target 126 may comprise an existing antenna (e.g., a shark fin antenna) on the vehicle.

The fault detection target 126 may comprise one or more markings. For example, the fault detection target 126 may comprise one or more geometric shapes, and the fault detection target 126 or portions thereof may comprise one or more patterns.

At least one region of the fault detection target 126 may have a reflectivity or color that is different from the reflectivity or color of the exterior surface of the vehicle, such that it can be easily distinguished from the vehicle's exterior by the Lidar system 118. Moreover, the fault detection target 126 may have varying reflectivity or color. For example, a first region of the fault detection target 126 may have a first reflectivity and/or color and a second region of the fault detection target 126 may have a second reflectivity and/or color.

The fault detection target 126 may be selected or positioned on the vehicle to maximize visibility by the Lidar system 118 while also limiting the obstruction to the field of view of the Lidar system 118 and other sensors 104. For example, the fault detection target 126 may be positioned at the back of the vehicle, given that the vehicle is typically moving forward. However, the position and arrangement of the fault detection target 126 may vary between vehicle models and Lidar systems. In some embodiments, the fault detection target 126 may have a raised component to ensure visibility by each channel of the Lidar system 118. The raised component may include one or more additional markings.

In some embodiments, the raised component is stationary, while in other embodiments the raised component may be an actuatable component that may be actuated into the field of view of the Lidar system 118 while the AV system 100 is stationary and actuated out of the field of view of the Lidar system 118 to avoid obstructing the view of the Lidar system 118 or other sensors 104 during operation of the vehicle. Consistent with these embodiments, the fault detection system 120 may actuate the component of the fault detection target 126 to raise and lower it. For example, the fault detection system 120 may raise the component of the fault detection target 126 in response to detecting a vehicle stop and may lower this component in response to determining that the vehicle is once again in motion.

In some embodiments, the fault detection system 120 may perform the fault condition analysis on a continuous basis, such that the fault detection system 120 evaluates the incoming Lidar data at each pass to detect fault conditions. In some embodiments, the fault detection system 120 may perform the fault condition analysis at periodic time intervals (e.g., every 30 seconds). In some embodiments, the fault condition analysis may be programmatically triggered. In some embodiments, the fault condition analysis may be triggered by certain external events or operations of the AV system 100. For example, the fault condition analysis may be triggered at each stop of the vehicle. Triggering the fault condition analysis at each stop may be especially useful in embodiments in which the fault detection target 126 comprises an actuatable component that is raised and lowered so as to avoid obstructing the field of view of the Lidar system 118 during movement of the vehicle.

Each of the localizer system 106, the perception system 108, the prediction system 110, the motion planning system 112, the fault detection system 120, and the vehicle controller 114 can include computer logic utilized to provide desired functionality. In some implementations, each of the localizer system 106, the perception system 108, the prediction system 110, the motion planning system 112, the fault detection system 120, and the vehicle controller 114 can be implemented in hardware, firmware, and/or software controlling a general-purpose processor. For example, in some implementations, each of the localizer system 106, the perception system 108, the prediction system 110, the motion planning system 112, the fault detection system 120, and the vehicle controller 114 includes program files stored on a storage device, loaded into a memory, and executed by one or more processors. In other implementations, each of the localizer system 106, the perception system 108, the prediction system 110, the motion planning system 112, the fault detection system 120, and the vehicle controller 114 includes one or more sets of computer-executable instructions that are stored in a tangible computer-readable storage medium such as random-access memory (RAM), a hard disk, or optical or magnetic media.

Figure 2:
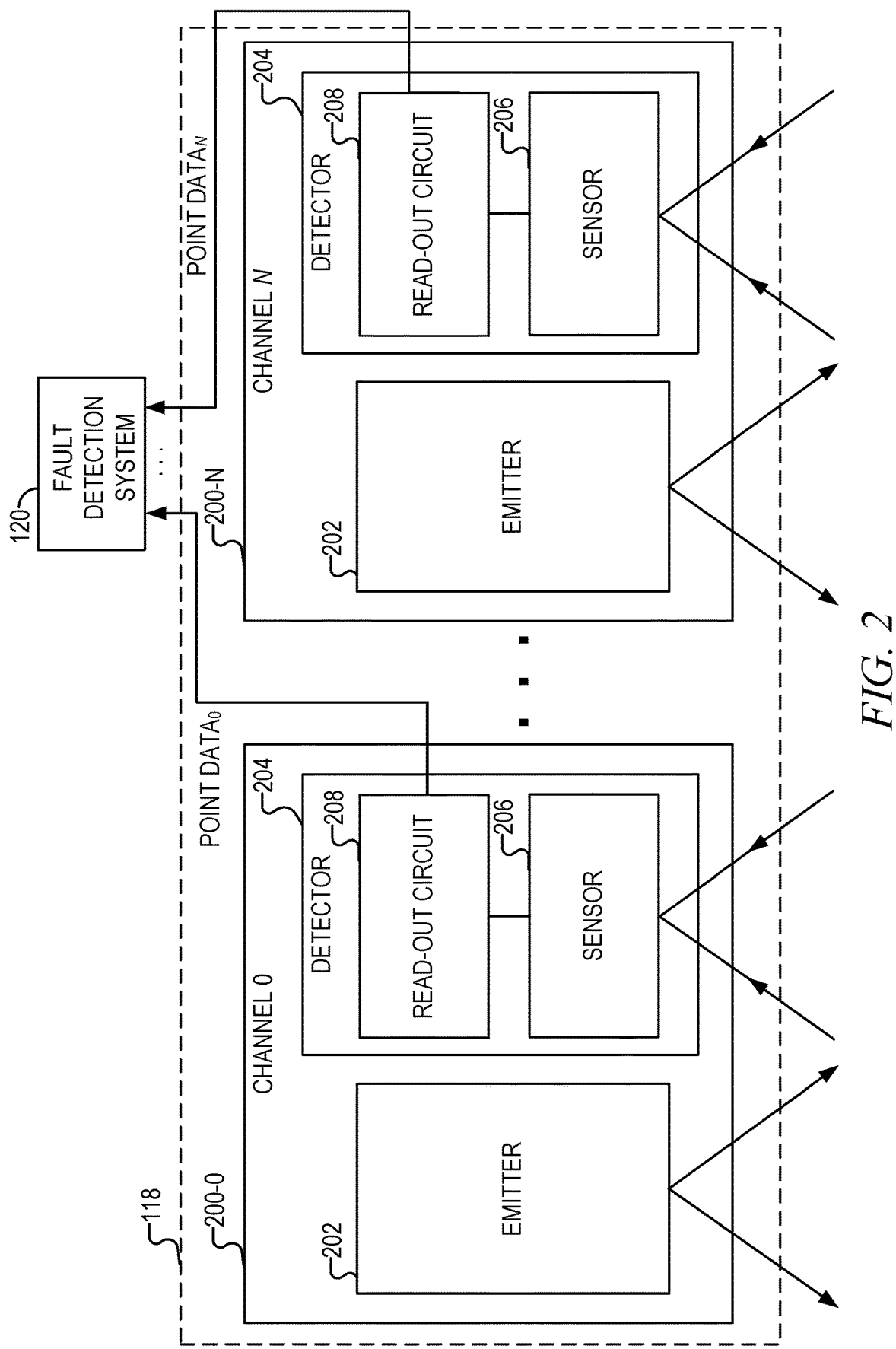
FIG. 2 is a block diagram illustrating a Lidar unit, which may be included as part of the AV system and in communication with the fault detection system, according to some embodiments.
Figure 3:
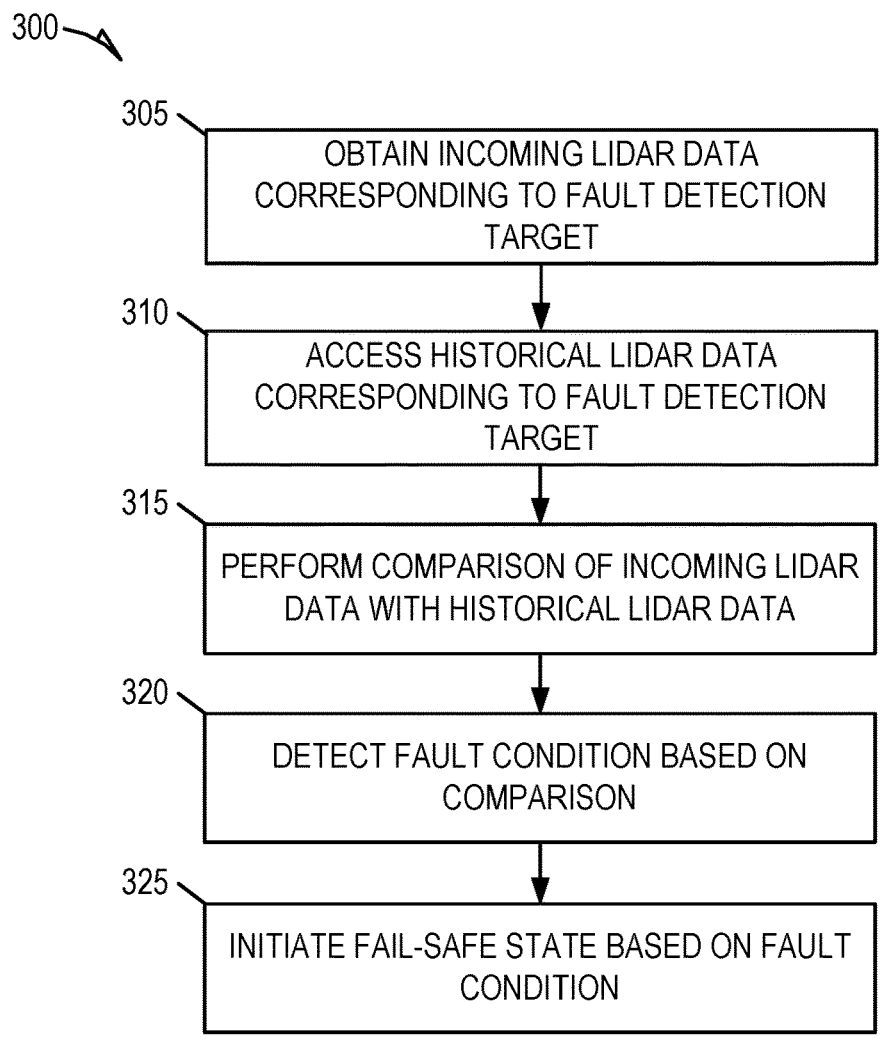
FIGS. 3-6 are flowcharts illustrating example operations performed as part of a method for fault detection in a Lidar system, according to some embodiments.

FIG. 2 is a block diagram illustrating the Lidar system 118, which may be included as part of the AV system 100, according to some embodiments. To avoid obscuring the inventive subject matter with unnecessary detail, various functional components that are not germane to conveying an understanding of the inventive subject matter have been omitted from FIG. 2. However, a skilled artisan will readily recognize that various additional functional components may be included as part of the Lidar system 118 to facilitate additional functionality that is not specifically described herein.

As shown, the Lidar system 118 comprises channels 200-0 to 200-N; thus, the Lidar system 118 comprises channels 0 to N. Each of the channels 200-0 to 200-N outputs point data that provides a single point of ranging information. Collectively, the point data output by each of the channels 200-0 to 200-N (i.e., point data$_{0-N}$) is combined to create a point cloud that corresponds to a three-dimensional representation of the surrounding environment.

Each of the channels 200-0 to 200-N comprises an emitter 202 (e.g., a laser emitter) paired with a detector 204. The emitter 202 emits a laser signal into the environment that is reflected off the surrounding environment and returned back to a sensor 206 (e.g., an optical detector) in the detector 204. For example, the emitter 202 may emit a laser signal into the environment that is reflected off the fault detection target 126.

The sensor 206 provides the return signal to a read-out circuit 208, and the read-out circuit 208, in turn, outputs the point data based on the return signal. The point data comprises a distance of the Lidar system 118 from a detected surface (e.g., a road) that is determined by the read-out circuit 208 by measuring the ToF, which is the time elapsed between the emitter 202 emitting the laser signal and the detector 204 detecting the return signal.

The point data further includes an intensity value corresponding to each return signal. The intensity value indicates a measure of intensity of the return signal determined by the read-out circuit 208. As noted above, the intensity of the return signal provides information about the surface reflecting the signal and can be used by any one of the localizer system 106, perception system 108, prediction system 110, and motion planning system 112 for localization, perception, prediction, and motion planning.

As shown, point data (i.e., point data$_{0-N}$) output by the channels 200-0 to 200-N of the Lidar system 118 is obtained by the fault detection system 120 to determine whether a fault condition is occurring at the Lidar system 118. As will be discussed in further detail below, the fault detection system 120 specifically analyzes point data corresponding to the fault detection target 126. That is, the point data analyzed by the fault detection system 120 includes data points corresponding to return signals resulting from emitted laser signals that have reflected off the fault detection target 126 so as to provide a standard for comparison with previous data. Hence, the fault detection system 120 may analyze only a subset of all point data output by the channels 200-0 to 200-N. Accordingly, the fault detection system 120 may identify and isolate the data points output by the Lidar system 118 that correspond to the fault detection target 126.

FIGS. 3-6 are flowcharts illustrating example operations performed as part of a method 300 for fault detection in a Lidar system, according to some embodiments. Any one or more of the operations of the method 300 may be embodied in computer-readable instructions for execution by a hardware component (e.g., a processor) such that these operations may be performed by one or more components of the AV system 100. Accordingly, the method 300 is described below, by way of example, with reference thereto. However, it shall be appreciated that the method 300 may be deployed on various other hardware configurations and is not intended to be limited to deployment on the AV system 100.

At operation 305, the fault detection system 120 obtains incoming Lidar data output by the Lidar system 118. The incoming Lidar data corresponds to the fault detection target 126. For example, the incoming Lidar data comprises a set of data points output by the Lidar system 118. The set of data points may include one or more data points output by each of the channels 200-0 to 200-N. Each data point comprises a raw intensity value and a range value. The raw intensity value includes a measure of intensity of a return signal, and the range value includes a measure of distance from the Lidar system 118 to a surface or object that reflected an emitted light signal. In particular, in the incoming Lidar data obtained at operation 305, each data point corresponds to a return signal resulting from an emitted light signal reflecting off of the fault detection target 126.

Consistent with some embodiments, the incoming Lidar data obtained at operation 305 corresponds to a subset of data points output by the Lidar system 118, where other data points output by the Lidar system 118 correspond to objects and surfaces in the surrounding environment other than the fault detection target 126. Accordingly, the fault detection system 120 may identify and isolate the data points output by the Lidar system 118 that correspond to the fault detection target 126.

At operation 310, the fault detection system 120 accesses historical Lidar data based on data points previously output by the Lidar system 118. The fault detection system 120 may access the historical Lidar data from a memory of the vehicle computing system 102. The historical Lidar data corresponds to the fault detection target 126. In particular, the historical Lidar data includes data points generated based on return signals resulting from emitted light signals reflecting off the fault detection target 126. In some embodiments, the historical Lidar data includes raw data from one or more passes over the fault detection target 126. That is, for a given point on the fault detection target 126, the historical Lidar data includes at least one raw range value and at least one raw intensity value. In some embodiments, the historical Lidar data includes an average of Lidar data from multiple prior passes over the fault detection target 126. That is, for a given point on the fault detection target 126, the historical Lidar data includes an average intensity value and an average range value. In some embodiments, the historical Lidar data may include one or more algorithms based on raw Lidar data such as and AI algorithm trained on raw Lidar data).

At operation 315, the fault detection system 120 performs a comparison of the incoming Lidar data with the historical Lidar data. As will be discussed in further detail below, the comparison includes determining a difference between the historical Lidar data and the incoming Lidar data.

At operation 320, the fault detection system 120 detects a fault condition based on the comparison. In some instances, the detected fault condition is detected at the Lidar system 118. For example, the fault detection system 120 may determine that a difference between the historical Lidar data and the incoming Lidar data satisfies a threshold condition, thereby signaling a fault condition. In many instances, the fault condition occurs at the Lidar system 118. In these instances, the fault condition may, for example, comprise or correspond to a damaged, dirty, or dislodged optical component (e.g., a lens of one or more sensors 206), a reduced or diminished intensity of laser signals emitted by one or more emitters 202, or a reduced sensitivity of one or more detectors 204. As will be discussed below, in other instances, the fault detection system 120 may detect a fault condition arising based on a misalignment of one or more of the sensors 104 (e.g., an image sensor).

At operation 325, the fault detection system 120 initiates a fail-safe state for the AV system 100. The initiating of the fail-safe state may include restricting or preventing one or more operations of the AV system 100. The fault detection system 120 may initiate the fail-safe state by providing one or more commands to the vehicle controller 114 and/or one or more components of the vehicle computing system 102. In response to the fault detection system 120 initiating the fail-safe state, the vehicle controller 114 may control operation of the AV such that the AV stops at a safe and available stopping location.

Figure 4:
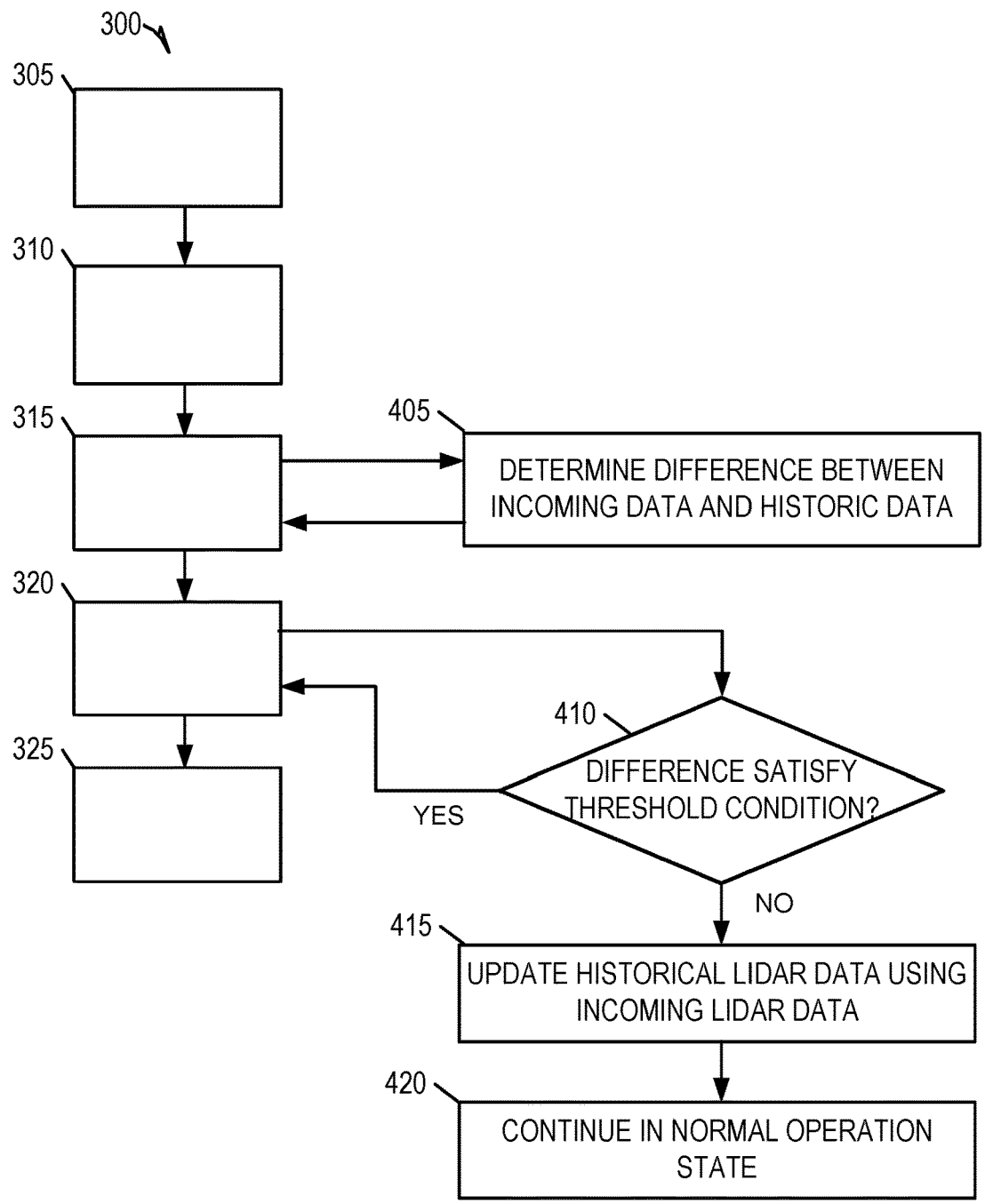

As shown in FIG. 4, the method 300 may, in some embodiments, include operations 405, 410, 415, and 420. Consistent with these embodiments, the operation 405 may be performed as part of operation 315, where the fault detection system 120 performs a comparison of the historical Lidar data and the incoming Lidar data.

At operation 405, the fault detection system 120 determines a difference between the incoming Lidar data and the historical Lidar data. In determining the difference between the incoming Lidar data and the historical Lidar data, the fault detection system 120 compares incoming data points from each of the channels 200-0 to 200-N with corresponding historical data points based on data previously generated by each of the channels 200-0 to 200-N. In performing this comparison, the fault detection system 120 compares an incoming data point corresponding to a particular location on the fault detection target 126 with a historical data point corresponding to the same location on the fault detection target 126. The fault detection system 120 may identify a difference in range values, intensity values, or both.

As an example, the fault detection system 120 may determine a difference between an incoming intensity value produced by channel 200-1 and a corresponding historical intensity value corresponding to data previously produced by the channel 200-1. As another example, the fault detection system 120 may determine a difference between an incoming range value produced by the channel 200-1 and a corresponding historical range value corresponding to data previously produced by the channel 200-1.

In some embodiments, the historical Lidar data comprises raw data points. Consistent with these embodiments, the fault detection system 120 determines a difference between a raw incoming data point value (e.g., a raw incoming intensity value or raw incoming range value) and a raw historical data point value (e.g., a raw historical intensity value or raw historical range value).

In some embodiments, the historical Lidar data includes one or more average data point values. Consistent with these embodiments, the fault detection system 120 determines a difference between a raw incoming data point value (e.g., a raw incoming intensity value or raw incoming range value) and an average historical data point value (e.g., an average historical intensity value or average historical range value). Accordingly, in performing the comparison of the incoming Lidar data with the historical Lidar data, the fault detection system 120 may determine a historical average intensity value, a historical average range value, or both. In some embodiments, the fault detection system 120 may determine a historical average value (e.g., intensity and/or range) for each of multiple locations on the fault detection target 126, while in other embodiments the fault detection system 120 may determine an overall historical average value (e.g., intensity and/or range) for the entire fault detection target 126. As will be discussed below, as new Lidar data is received, the fault detection system 120 may update the historical Lidar data, for example, by updating one or more average values.

The operation 410 may, in some embodiments, be performed as part of the operation 320 where the fault detection system 120 detects a fault condition occurring at the Lidar system 118. At operation 410, the fault detection system 120 determines whether the difference between the incoming Lidar data and the historical Lidar data satisfies a threshold condition. The fault detection system 120 detects the fault condition occurring at the Lidar system 118 if the fault detection system 120 determines that the difference satisfies the threshold condition. For example, the threshold condition may specify a threshold and the fault detection system 120 may determine that the difference satisfies the threshold condition if the difference exceeds the threshold. In a more specific example, the fault detection system 120 may determine that a difference between an incoming range value and a historical range value exceeds a threshold. As another example, the fault detection system 120 may determine that a difference between an incoming intensity value and a historical intensity value exceeds a threshold.

The threshold condition may correspond to a pre-determined or configurable tolerance in differences between incoming and historical Lidar data. This tolerance may be set such that the differences between the incoming and historical Lidar data do not impact the proper functioning of the components of the AV system 100.

If the fault detection system 120 determines that the difference does not satisfy the threshold condition, the fault detection system 120 updates the historical Lidar data using the incoming Lidar data, at operation 415. In some embodiments, the fault detection system 120 updates the historical Lidar data by adding one or more data points from the incoming Lidar data to the historical Lidar data or replacing one or more data points in the historical Lidar data with one or more data points from the incoming Lidar data. In some embodiments, the fault detection system 120 updates the historical Lidar data by recalculating one or more average values based on data points from the incoming Lidar data. Further, based on a determination at operation 410 that the difference does not satisfy the threshold condition, the AV system 100 continues in a normal operation mode (at operation 420).

The method 300 as described above may, in some embodiments, be repeated on a continuous basis such that the fault detection system 120 analyzes the incoming Lidar data at each pass to detect fault conditions and updates the historical Lidar data with the incoming Lidar data if no fault is detected. In some embodiments, the method 300 may be programmatically triggered. In some embodiments, the method 300 may be repeated at periodic time intervals (e.g., every 30 seconds).

Consistent with the embodiments described above in reference to FIG. 4, the historical data average may be used to detect a sudden change. However, in some embodiments, it may be undesirable to update the historical data average because gradual degradations in incoming Lidar data would slowly lead to a lower historical data average, which may result in the fault detection system 120 ignoring potential fault conditions. Accordingly, in some embodiments, historical Lidar data is stored when the AV system 100 is first qualified and commissioned. If there is a later degradation in the operation of the Lidar system 118, the fault detection system 120 may detect a fault condition based on the initial historical Lidar data.

Figure 5:
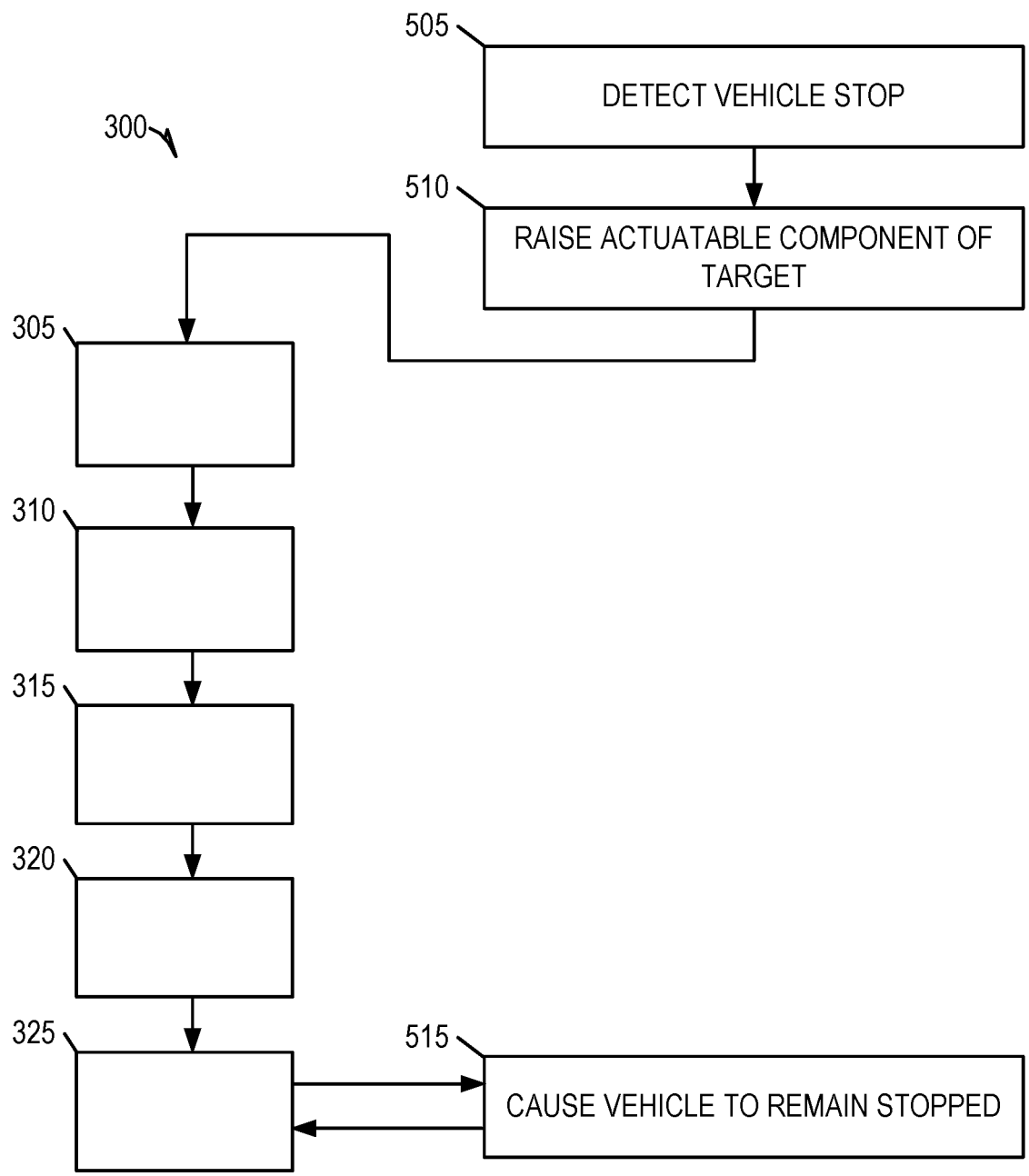

In some embodiments, the method 300 may be triggered by certain external events or operations of the AV system 100. For example, as shown in FIG. 5, the method 300 may, in some embodiments, include operations 505, 510, and 515. Consistent with these embodiments, the operations 505 and 510 may be performed prior to operation 305, where the fault detection system 120 obtains the incoming Lidar data. At operation 505, the fault detection system 120 detects that the vehicle has stopped at a stopping location. The stopping location may, for example, be a location where the AV stops to pick up or drop off one or more passengers, one or more pieces of cargo, or an item or a location where the AV stops because of a traffic signal, stop sign, or other roadway feature. In some examples where the AV is used to provide a ride service for passengers, the stopping location can be a place where the AV picks up or drops off a passenger. In other examples where the AV is used to provide a delivery service of food or other purchased items, the stopping location can be a place where the AV parks to pick up an item or items for delivery or a place where the AV makes a delivery of an item or items to a customer. Non-limiting examples of stopping locations include intersections, parking spots, driveways, roadway shoulders, and loading docks.

The fault detection system 120 may detect the vehicle being stopped at the stopping location based on motion sensor data, Global Positioning System (GPS) data, sensor data provided by the sensors 104, other data provided by one or more components of the vehicle computing system 102 (e.g., IMUs), or a combination thereof. In some embodiments, the operations 315, 320, and 325 are performed in response to detecting that the vehicle has stopped at the stopping location.

In embodiments in which the fault detection target 126 includes an actuatable component that can be raised and lowered, the fault detection system 120 actuates the component so that it becomes raised (at operation 510) and is visible by each of the channels 200-0 to 200-N of the Lidar system 118. Accordingly, at operation 305, the incoming Lidar data obtained by the fault detection target 126 includes one or more data points corresponding to the raised component.

Consistent with these embodiments, the operation 515 may be performed as part of (e.g., a sub-routine or sub-task of) operation 325 where the fault detection system 120 initiates a fail-safe state at the AV system 100. At operation 515, the fault detection system 120 causes the AV to remain stopped at the stopping location. For example, the fault detection system 120 may provide a command to the vehicle controller 114 to remain stopped at the stopping location. The AV system 100 may remain stopped at the stopping location until a remediation action is performed to correct the fault condition or until further commands are provided to the vehicle controller 114.

Figure 6:
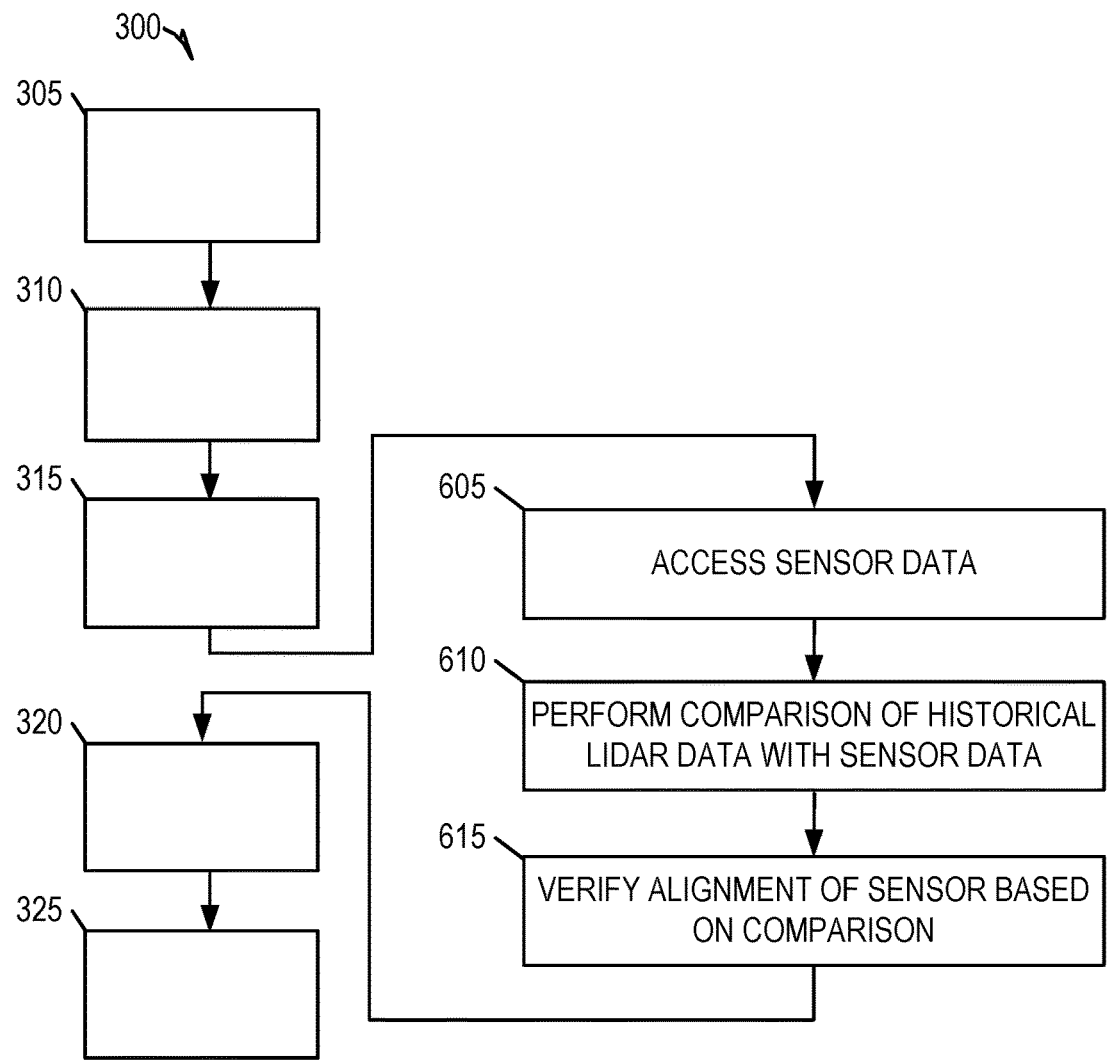

As described above, the fault detection system 120 may utilize the fault detection target 126 to detect fault conditions occurring at the Lidar system 118. In addition to fault conditions occurring at the Lidar system 118, the fault detection system 120 may utilize the fault detection target 126 to detect fault conditions occurring at other sensors 104, such as a misalignment of one or more sensors 104. As shown in FIG. 6, the method 300 may, in some embodiments, further include operations 605, 610, and 615. Consistent with these embodiments, the operations 605, 610, and 615 may be performed prior to or as part of operation 320 where the fault detection system 120 detects the fault condition.

At operation 605, the fault detection system 120 accesses sensor data produced by one of the sensors 104. For example, the fault detection system 120 may access image data produced by an image sensor (e.g., a camera).

At operation 610, the fault detection system 120 performs a comparison of the sensor data with the historical Lidar data. In comparing the sets of data, the fault detection system 120 may correlate a location of the fault detection target 126 represented in the historical Lidar data with a location of the fault detection target 122 represented in the sensor data. For example, the fault detection system 120 may correlate the location of the fault detection target 126 in the historical Lidar data with the location of the fault detection target 126 in the image data. As noted above, the fault detection target 126 may comprise one or more contrasting shapes or patterns, which would facilitate this correlation.

At operation 615, the fault detection system 120 verifies the alignment of the one of the sensors 104. If the locations of the fault detection target 126 in both the historical Lidar data and the sensor data correspond within at least a predetermined margin of error, the fault detection system 120 determines that the alignment of the sensor 104 is correct. Otherwise, the fault detection system 120 may determine that the sensor 104 is misaligned, thereby resulting in a fault condition being detected at operation 320.

Figure 7:
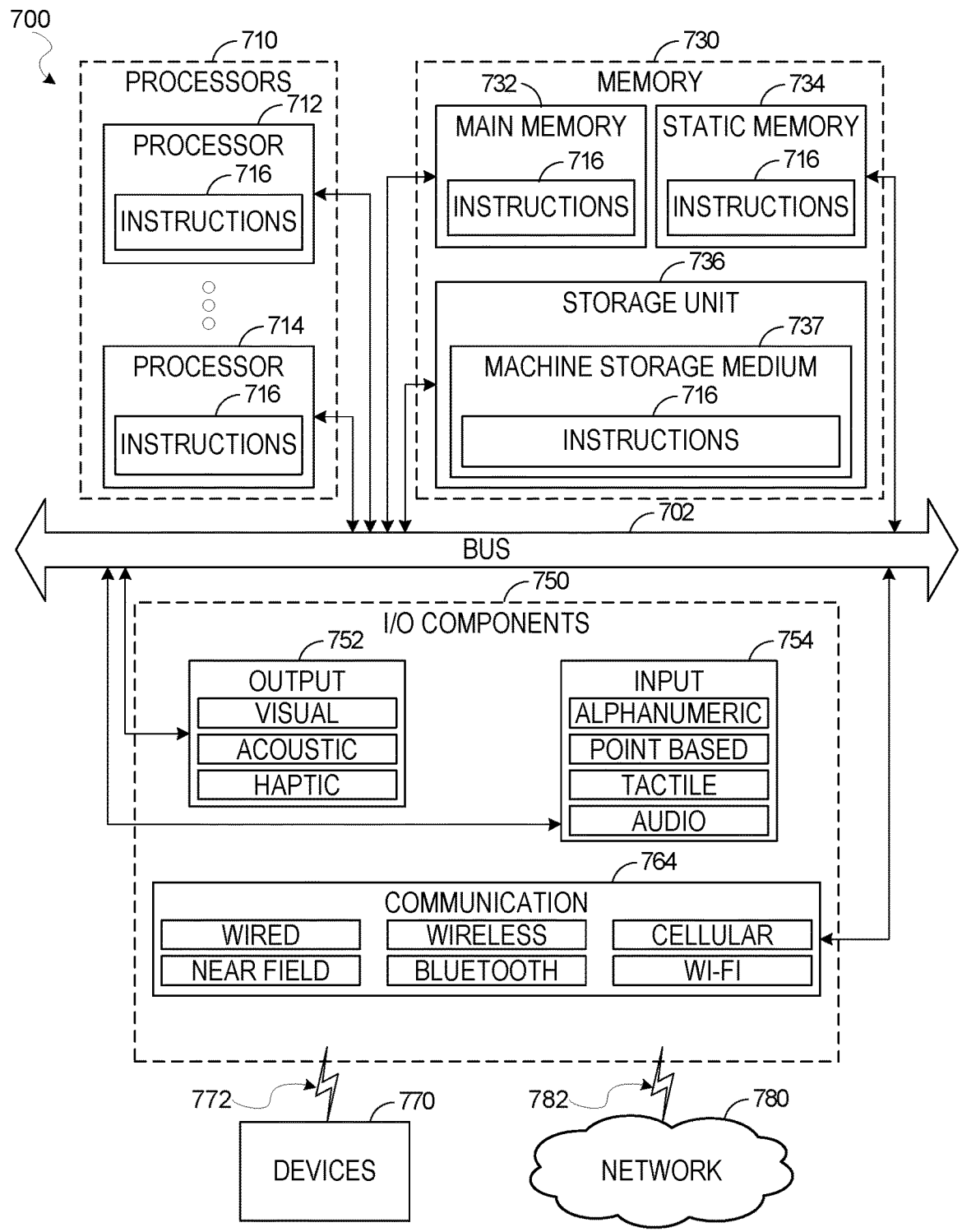
FIG. 7 is a diagrammatic representation of a machine in the example form of a computer system within which a set of instructions for causing the machine to perform any one or more of the methodologies discussed herein may be executed.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 300. In this way, the instructions 716 transform a general, non-programmed machine into a particular machine 700, such as the fault detection system 120 or the vehicle computing system 102, that is specially configured to carry out the described and illustrated functions in the manner described herein. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736 comprising a machine storage medium 737, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities (e.g., Bluetooth, Wi-Fi, and near-field communication (NFC)). The devices 770 may be another machine or any of a wide variety of peripheral devices (e.g., a peripheral device coupled via a universal serial bus (USB)).

Executable Instructions and Machine-Storage Medium

The various memories (e.g., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions, when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" and "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. An autonomous vehicle (AV) system comprising:
   a Lidar system;
   a fault detection target on an exterior of a vehicle; and
   a fault detection system comprising one or more hardware processors to perform operations comprising:
   obtaining incoming Lidar data output by the Lidar system during operation of the AV system, the incoming Lidar data comprising data descriptive of one or more objects in an environment in which the AV system is located and comprising at least one Lidar point corresponding to the fault detection target;
   accessing, from memory, historical Lidar data based on previous output of the Lidar system, the historical Lidar data comprising at least one historical Lidar point corresponding to the fault detection target from the previous output of the Lidar system, the at least one historical Lidar point comprising at least one of a historical average range value or a historical average intensity value based on multiple prior passes over the fault detection target;
   performing a comparison of incoming data points of the incoming Lidar data with historical data points of the historical Lidar data;
   detecting a fault condition at the Lidar system based on the comparison; and
   initiating a fail-safe state based on detecting the fault condition.

2. The AV system of claim 1, wherein the performing of the comparison of the incoming Lidar data with the historical Lidar data comprises:
   determining a difference between the incoming Lidar data and the historical Lidar data.

3. The AV system of claim 2, wherein the detecting of the fault condition comprises:
   determining that the difference between the incoming Lidar data and the historical Lidar data satisfies a threshold condition.

4. The AV system of claim 2, wherein the difference comprises one of:
   a difference between a historical intensity value and an incoming intensity value; or
   a difference between a historical range value and an incoming range value.

5. The AV system of claim 1, wherein one or more operations of the AV system are restricted while the AV system is in the fail-safe state.

6. The AV system of claim 1, wherein the initiating of the fail-safe state comprises providing one or more commands to a vehicle controller.

7. The AV system of claim 1, wherein the fault detection target comprises a coating applied to the exterior of the vehicle.

8. The AV system of claim 1, wherein the fault detection target comprises one or more markings that are visible within a field of view of the Lidar system.

9. The AV system of claim 1, wherein the operations further comprise:
   detecting that the vehicle is stopped at a location, wherein the fault detection system obtains the incoming Lidar data in response to detecting that the vehicle is stopped at the location.

10. The AV system of claim 9, wherein the initiating of the fail-safe state comprises:
    causing the vehicle to remain stopped at the location until a remediation action is performed.

11. The AV system of claim 9, wherein:
    the fault detection target further comprises an actuatable component; and
    the fault detection system actuates the actuatable component in response to detecting that the vehicle is stopped.

12. The AV system of claim 1, wherein the fault condition includes one or more of: a damaged component, a dirty component, a dislodged component, a reduced or diminished intensity of laser signals emitted by the Lidar system, or a reduced sensitivity of a detector of the Lidar system.

13. A method comprising:
obtaining incoming Lidar data output by a Lidar system during operation of an autonomous vehicle (AV) system, the incoming Lidar data corresponding to a fault detection target on an exterior of a vehicle of the AV system;
accessing, from a memory of the AV system, historical Lidar data based on previous output of the Lidar system, the historical Lidar data corresponding to the fault detection target and comprising at least one of a historical average range value or a historical average intensity value based on multiple prior passes over the fault detection target;
performing, by one or more hardware processors of a vehicle computing system, a comparison of the incoming Lidar data with the historical Lidar data;
detecting a fault condition at the Lidar system based on the comparison; and
initiating a fail-safe state at the AV system based on detecting the fault condition.

14. The method of claim 13, wherein:
the performing of the comparison of the incoming Lidar data with the historical Lidar data comprises determining a difference between the incoming Lidar data and the historical Lidar data; and
the detecting of the fault condition comprises determining that the difference between the incoming Lidar data and the historical Lidar data satisfies a threshold condition.

15. The method of claim 14, wherein the difference comprises one of:
a difference between a historical intensity value and an incoming intensity value; or
a difference between a historical range value and an incoming range value.

16. The method of claim 13, wherein one or more operations of the AV system are restricted while the AV system is in the fail-safe state.

17. The method of claim 13, further comprising:
detecting that the vehicle is stopped at a location, wherein the obtaining of the incoming Lidar data is in response to detecting that the vehicle is stopped at the location.

18. The method of claim 17, wherein the initiating of the fail-safe state comprises:
causing the vehicle to remain stopped at the location.

19. The method of claim 17, wherein:
the fault detection target further comprises an actuatable component; and
the method further comprises actuates the actuatable component in response to detecting that the vehicle is stopped.

20. A machine storage medium storing instructions that, when executed by one or more processors of a vehicle computing system, cause the vehicle computing system to perform operations comprising:
obtaining incoming Lidar data output by a Lidar system during operation of an AV system, the incoming Lidar data corresponding to a fault detection target on an exterior of a vehicle of the AV system;
accessing, from memory, historical Lidar data based on previous output of the Lidar system, the historical Lidar data corresponding to the fault detection target, the historical Lidar data comprising at least one of a historical average range value or a historical average intensity value based on multiple prior passes over the fault detection target;
performing a comparison of the incoming Lidar data with the historical Lidar data;
detecting a fault condition at the Lidar system based on the comparison; and
initiating a fail-safe state at the AV system based on detecting the fault condition at the Lidar system.

* * * * *